US 6,661,539 B1

(12) United States Patent
Nee

(10) Patent No.: US 6,661,539 B1
(45) Date of Patent: Dec. 9, 2003

(54) VERTICALLY ORIENTED DOCUMENT SCANNER

(75) Inventor: Wright Jacken Nee, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/480,414

(22) Filed: Jan. 11, 2000

(51) Int. Cl.$^7$ .............................. H04N 1/04; H04N 1/46
(52) U.S. Cl. ...................... 358/474; 358/497; 358/506; 361/686
(58) Field of Search ................................ 358/497, 487, 358/506, 492, 296, 474; 361/686, 683

(56) References Cited

U.S. PATENT DOCUMENTS

| 5,548,417 A | * | 8/1996 | Sekimoto et al. | ............ 358/474 |
| 6,208,437 B1 | * | 3/2001 | Neushul | ...................... 358/487 |
| 6,233,064 B1 | * | 5/2001 | Griffin | ......................... 358/474 |

* cited by examiner

Primary Examiner—Edward Coles
Assistant Examiner—Jason Sherrill
(74) Attorney, Agent, or Firm—Roy W. Truelson

(57) ABSTRACT

A flatbed-type digital scanner has a vertically oriented scanning surface. Because the size of the scanner in a dimension normal to the scanning surface is significantly less than the length or width of the scanning surface, the scanner is taller than it is wide, and consumes less space on a desktop than conventional flatbed scanners. Preferably, an outer cover and an intermediate transparent cover are attached to the scanner by a hinge near the bottom. The inner surface of the outer cover has a relatively high coefficient of friction, to prevent slippage of documents. To scan a document, the outer cover is pulled down to a horizontal position, and the document is placed face-up on the outer cover, and the intermediate cover is lowered into position next to the outer cover, so that the scanned document is held in place between the two covers. The two covers are then rotated together to position the document next to the scanning surface for scanning. A latch mechanism holds the covers in place during rotation. The scanner may optionally be wall mounted or mounted in a conventional orientation. This digital scanner reduces consumption of critical desktop area. An additional advantage is that it is easier to align multiple small documents, such as photographs, because these are placed in a face-up position on the horizontally positioned cover.

16 Claims, 9 Drawing Sheets

VERTICALLY ORIENTED DOCUMENT SCANNER

FIELD OF THE INVENTION

The present invention relates to digital data processing devices, and in particular to devices for scanning documents to create digital images.

BACKGROUND OF THE INVENTION

The latter half of the twentieth century has been witness to a phenomenon known as the information revolution. While the information revolution is a historical development broader in scope than any one event or machine, no single device has come to represent the information revolution more than the digital electronic computer. The development of computer systems has surely been a revolution. Each year, computer systems grow faster, store more data, and provide more applications to their users.

Early computer systems were very expensive and difficult to use, capable of being programmed and manipulated by only a handful of highly-educated specialists. The cost of operating such computers was correspondingly high, and they were therefore used for only the most essential tasks. The dynamic which has driven the information revolution is the sustained reduction in the cost of computing. Thus, information which was too expensive to gather, store and process a few years ago, is now economically feasible to manipulate via computer. The reduced cost of information processing drives increasing productivity in a snowballing effect, because product designs, manufacturing processes, resource scheduling, administrative chores, and many other factors, are made more efficient.

The declining prices and expanding capabilities of modern computers cause them to be applied to an ever increasing variety of applications. For some years now, inexpensive "personal computers" have been available for personal use at home or for the use of a single individual at a place of business. Although small, these machines provide capability that could have only been imagined not long ago.

Computing power and digital storage being as inexpensive as they are, it has become increasingly popular to create digital records of matter previously embodied in other formats. Digital records enable visual images, audio recordings, and the like, to be stored in digital computers, replicated with digital copying devices, edited using highly flexible and sophisticated editing tools, and transmitted over digital networks, such as the Internet.

Digital images may be created in various ways, but one of the most straightforward is to scan a document, photograph, or similar visual image to create a digital copy of the visual image. For this purpose, many digital equipment manufacturers offer a peripheral device for a computer, known as a "flatbed scanner". Typically, a flatbed scanner is a box-like device of short stature, having a width and length a little larger than a piece of paper of some standard size. The upper horizontal surface of the scanner contains a glass scanning surface, over which rests a removable cover. The cover is lifted, and a document is placed face down on the scanning surface. An internal carriage containing digital optical sensors moves inside the scanner from one end of the scanning surface to the other, scanning the document and creating a digital image as it moves. The flatbed scanner is typically coupled to a computer via a data communications cable, and as it scans the image, the data is transmitted to the computer. The computer may compress the data using any of various compression techniques, and stores the scanned image in its internal storage, typically a rotating magnetic disk drive storage device.

Because personal computers and their associated peripheral devices are often used in homes and small offices where space is at a premium, it is desirable to reduce the amount of space used by such devices, and in particular, the amount of desktop space used. For example, many personal computers are designed with a floor-mounted "tower" system unit, containing the processor, main memory, and storage devices, while input devices such as a keyboard and mouse, and video display unit, are remotely attached via cable. This flexibility allows the user to put the system unit on the floor or at another less valuable location, while only the display unit goes on the desktop, leaving the desktop as free as possible. In a similar vein, a number of "multi-function" devices, which combine the functions of printer, copier, fax machine, answering machine, telephone, and/or scanner, have been marketed, one of the chief advantages of such devices being that they conserve space.

Unfortunately, flatbed scanners remain major space consumers. Since the flatbed scanner must be at least as long and wide as the document to be scanned, there are limits to the size reduction possible. While there are alternatives to flatbed scanners (such as hand-held scanners or paper-feed scanners, in which a document being scanned is moved past a stationary scanning mechanism), flat-bed scanners provide certain advantages in accuracy and flexibility that are not possible with alternative devices. An unrecognized need exists for a flatbed-type scanning device which, while not necessarily smaller than conventional flatbed scanners, consumes less valuable space, and in particular, consumes less of the desktop.

SUMMARY OF THE INVENTION

A flatbed-type digital scanning device has a vertically oriented scanning surface. Because the internal mechanism is such that the size of the device in a dimension normal to the scanning surface is significantly less than the length or width of the scanning surface, the device is taller (vertically) than it is wide (in the dimension normal to the scanning surface), and consumes a smaller area of space even though its volume may be the same as conventional flatbed scanners.

In the preferred embodiment, an outer cover is attached to the scanner by a hinge near the bottom of the scanning surface. The inner surface of the outer cover is a light-colored material having a relatively high coefficient of friction, to prevent slippage of documents. To scan a document, the outer cover is pulled down to an approximately horizontal position, and the document is placed face-up on the outer cover. An intermediate transparent cover is also attached via a hinge along the same axis, the intermediate transparent cover being positioned for rotation between the outer cover and the scanning surface. The intermediate cover is left in a vertical orientation while the document is being aligned on the outer cover, and then lowered into position next to the outer cover, so that the scanned document is held in place between the two covers. The two covers are then rotated together to position the document next to the scanning surface for scanning. A latch mechanism holds the covers in place during rotation.

Preferably, the outer cover has feet near the end opposite the hinge to stabilize the device while the cover is in the lowered position.

In the preferred embodiment, the scanner has feet for placing the scanning surface in a horizontal orientation or a vertical orientation, according to the user's choice. The scanner also has appropriate receiving cavities for wall mounting.

The digital scanning device herein described reduces consumption of critical desktop area. An additional advantage of the device is that it is easier to align multiple small documents, such as photographs, because these are placed in a face-up position on the horizontally positioned cover.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
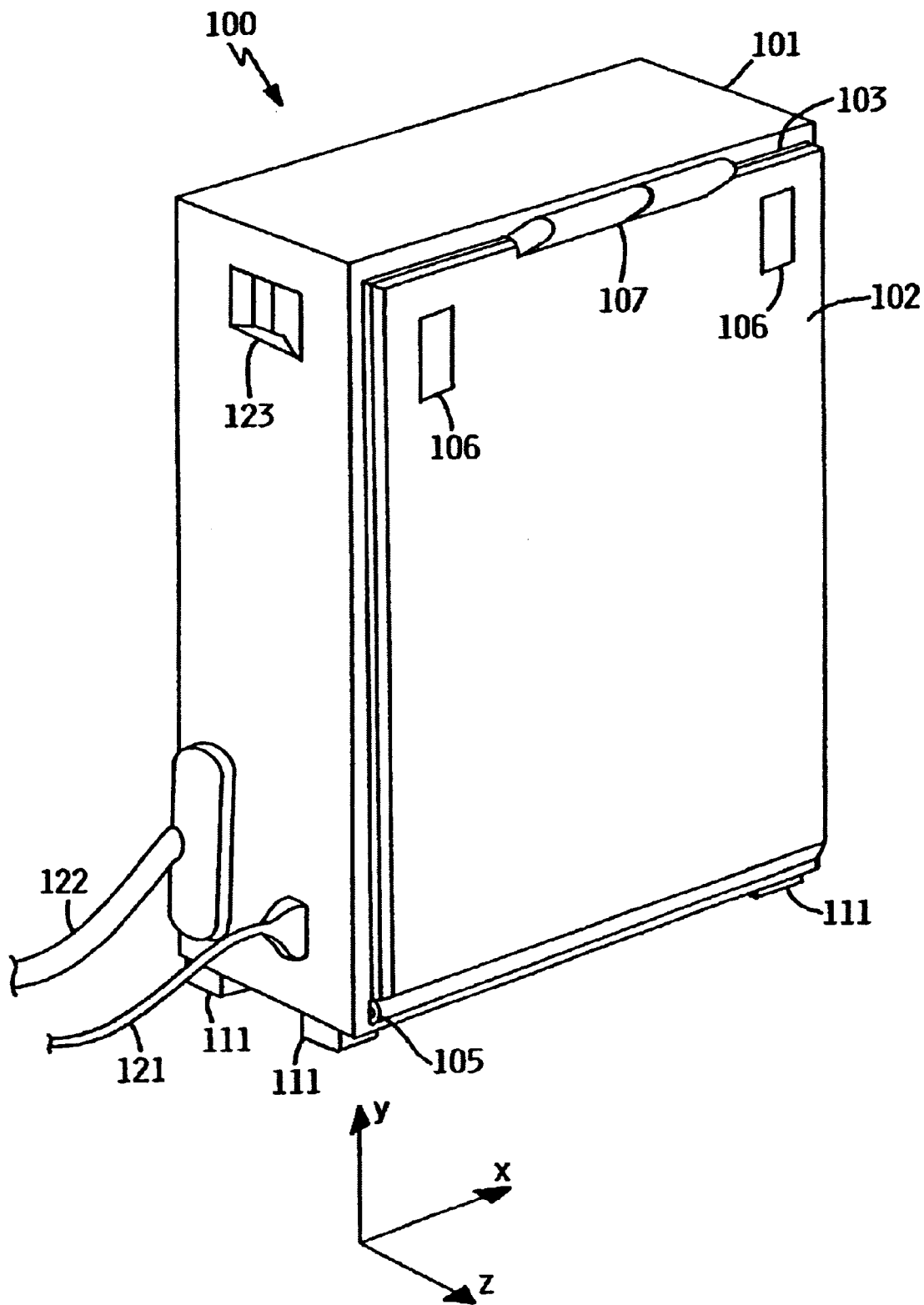
FIG. 1 is a perspective view of a digital document scanning device, with covers in closed position for scanning or idle, according to the preferred embodiment of the present invention.
Figure 2:
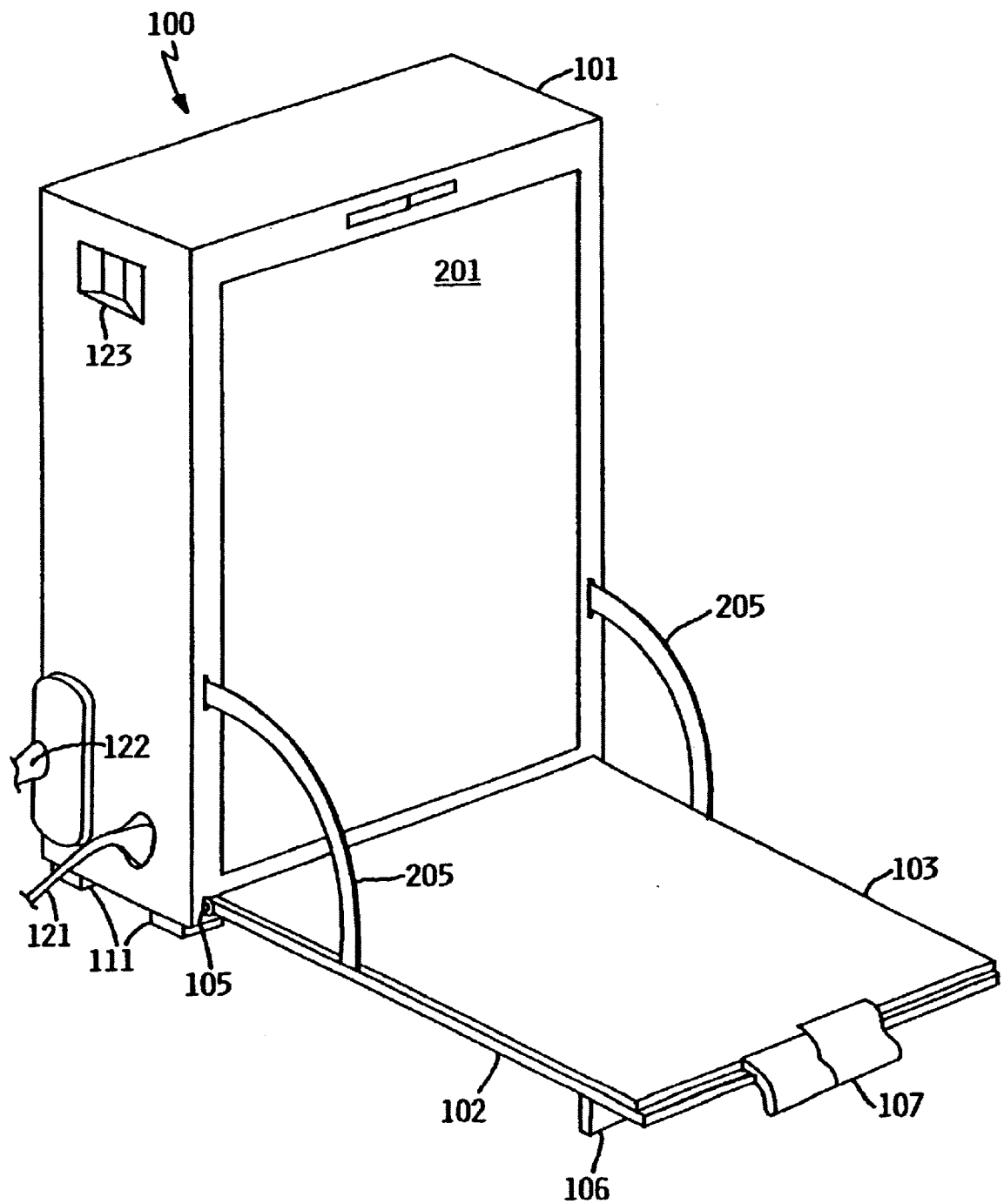
FIG. 2 is a perspective view of a digital document scanning device, with covers in horizontal position, in accordance with the preferred embodiment.

Referring to the Drawing, wherein like numbers denote like parts throughout the several views, FIGS. 1 and 2 are perspective views of a digital document scanning device 100, in accordance with the preferred embodiment of the present invention. FIG. 1 shows the scanner with covers in closed position, which is the normal position when the device is idle, or when a document is being scanned. FIG. 2 shows the scanner with both covers in a horizontal position, which is used for placing documents to be scanned on the cover, as described more fully herein. Scanner 100 is housed in a frame 101 in the shape of a substantially rectangular parallelopiped, the edges of which correspond to three perpendicular axes, x, y and z. For consistency of description and ease of understanding, the vertical direction is referred to herein as the y-dimension or y-axis, the horizontal direction parallel to cover 102 is referred to herein as the x-dimension or x-axis, and the horizontal direction perpendicular to the cover, corresponding to the shortest edge of frame 101, is referred to herein as the z-dimension or z-axis, as indicated in FIG. 1, it being understood that designation of axes is purely arbitrary. Outer cover 102 is a flat, rectangular member attached by elongated hinge 105 to frame 101 along the bottom of the frame. An intermediate transparent cover 103 is also attached to hinge 105, and sandwiched between outer cover 102 and frame 101. A transparent scanning surface 201 covers interior optical, electrical and mechanical components used for scanning images, the images being visible to the interior components through transparent scanning surface 201. In closed position, covers 102 and 103 conceal scanning surface 201.

Covers 102 and 103 rotate about the x-axis on hinge 105. Covers 102 and 103 are capable of independent rotation, so that cover 102 may be rotated down to a horizontal position, while cover 103 remains vertical or in any intermediate position. A pair of travel limit arms 205 attached to cover 102 limit rotation of the covers beyond horizontal position. A pair of swing-down feet 106, described more fully herein, extend to support cover 102 when the latter is in a horizontal position. A latch mechanism 107, described more fully herein, latches covers 102 and 103 in vertical position, or latches only cover 103 in vertical position, or latches the two covers in unison.

Frame 100 rests on four feet 111 (of which three are visible in FIG. 1), which are made of a soft, resilient material such as rubber. A power cable 121 for supplying electrical power to scanner 100 connects to frame 101 at a side, near the bottom, as shown. Data cable 122 for communicating with a digital computing device connects to frame 100 near the power cable connection. Power switch 123 is located on the side of frame 100, near the top, as shown. Scanner may optionally contain a small control panel (not shown) for controlling scanner functions.

Figure 3:
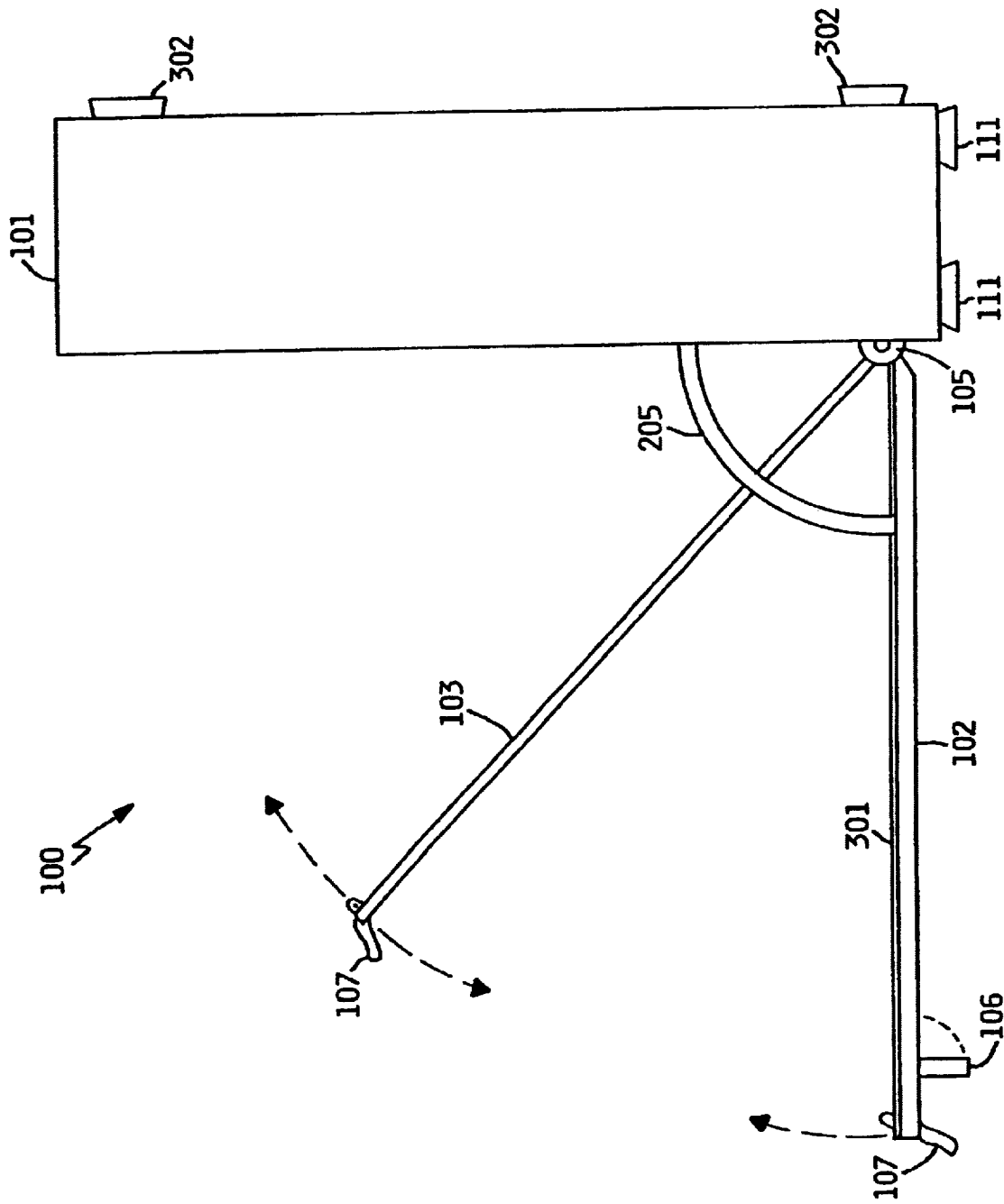
FIG. 3 is a side plan view of a digital document scanning device, according to the preferred embodiment.

FIG. 3 is a side view of scanner 100. FIG. 3 shows outer cover 102 in horizontal position, with rotating feet 106 lowered to support the cover. Intermediate cover 103 is shown in a position between horizontal and vertical. As depicted in FIG. 3, when the outer cover is fully lowered to horizontal position, the intermediate cover may assume a vertical position next to scanning surface 201, a horizontal position next to outer cover 102, or any position in between.

Also shown in FIG. 3 are feet 302 projecting from the rear surface (i.e., the surface opposite scanning surface 201) of frame 101. Four feet 302 project from the rear surface, of which only two are visible in FIG. 3. Feet 302 are identical in size and composition to feet 111. Feet 302 allow scanner 101 to be rotated 90 degrees for optional use in a conventional orientation, i.e., with the scanning surface 201 oriented horizontally.

Outer cover 102 is a stiff, opaque polymeric material. For consistent appearance, cover 102 may be of the same material as the outer portion of frame 101. Many suitable polymers exist, such as ABS, polycarbonate, etc. On the inner surface of outer cover 102 is a resilient layer 301 having a relatively high coefficient of friction, for retaining documents in place. This layer is preferably white in color. Silicone rubber may be used for the resilient layer 301, although many other suitable materials are available. Travel limit arms 205 are preferably steel.

Transparent intermediate layer 103 is a stiff, transparent material. Glass, transparent polycarbonate, or other suitable materials may be used. In the preferred embodiment, layers 102 and 103 are attached to a common hinge assembly and rotate on a common axis, although they could be attached to separate hinges. The transparent layer, for example, could be attached to a separate hinge at the end of cover 102 opposite hinge 105. Alternatively, the transparent layer could be attached to a separate hinge or pair of hinges near and alongside hinge 105, the separate hinge(s) accommodating thicker documents.

Figure 4:
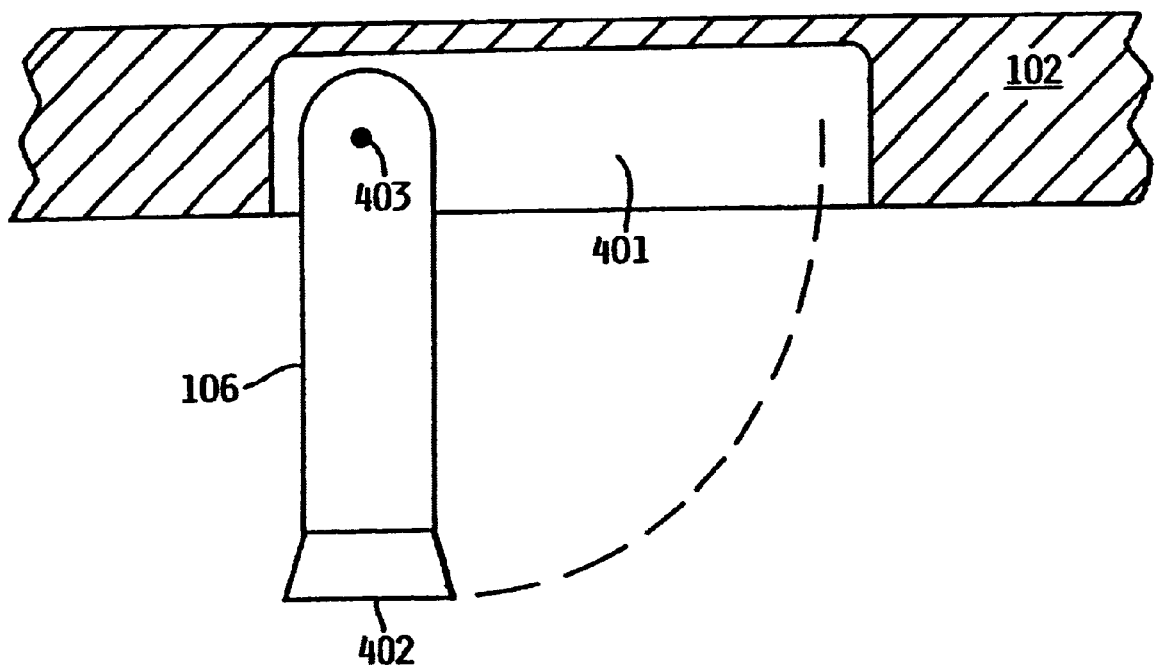
FIG. 4 is a sectional detailed view of a portion of the outer cover, showing in greater detail the swing-down foot, according to the preferred embodiment.

FIG. 4 is a sectional detailed view of a portion of cover 102, showing in greater detail swing-down foot 106. Each foot 106 is mounted in a respective recess 401 in cover 102. Foot 106 is hinged on an axis 403 parallel to the axis of hinge 105, axis 403 being perpendicular to the plane of the detailed section view of FIG. 4. Foot 106 may be attached to cover 102 via a small cylindrical coaxial pin, via a pair of coaxial projections from either side of the foot, or other means. At the bottom of foot 106 is a rubber pad 402 for contact with a table, desk or similar surface. Foot 106 may optionally contain a weight (not shown) near the bottom thereof. Foot 106 is rotated by gravitational force. When cover 102 is in a vertical position, foot 106 rotates to a position inside recess 401. When cover 102 is rotated to a horizontal position, foot 106 rotates to its extended position substantially perpendicular to the cover, as depicted in FIG. 4, thereby providing support for the cover.

Figure 5A:
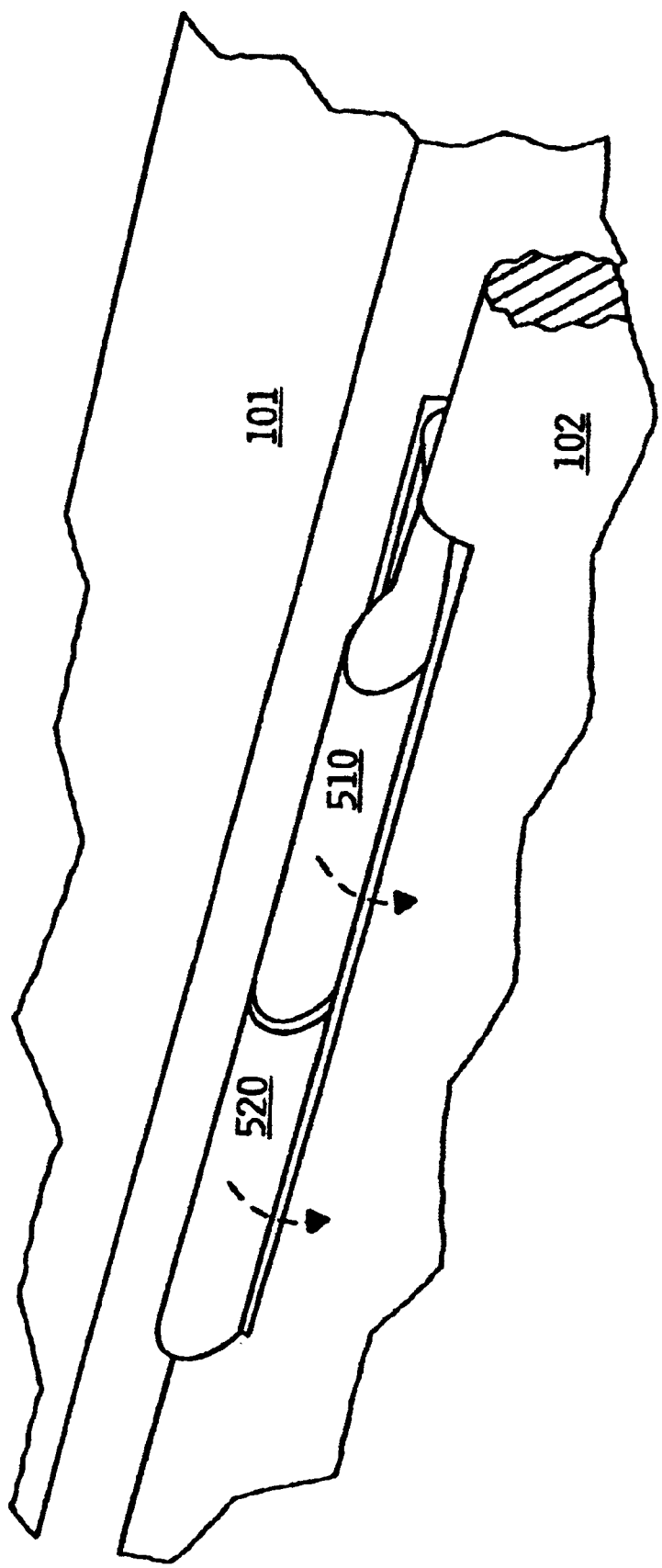
FIG. 5A is a perspective view of the latch mechanism for latching the scanner covers, according to the preferred embodiment.
Figure 5B:
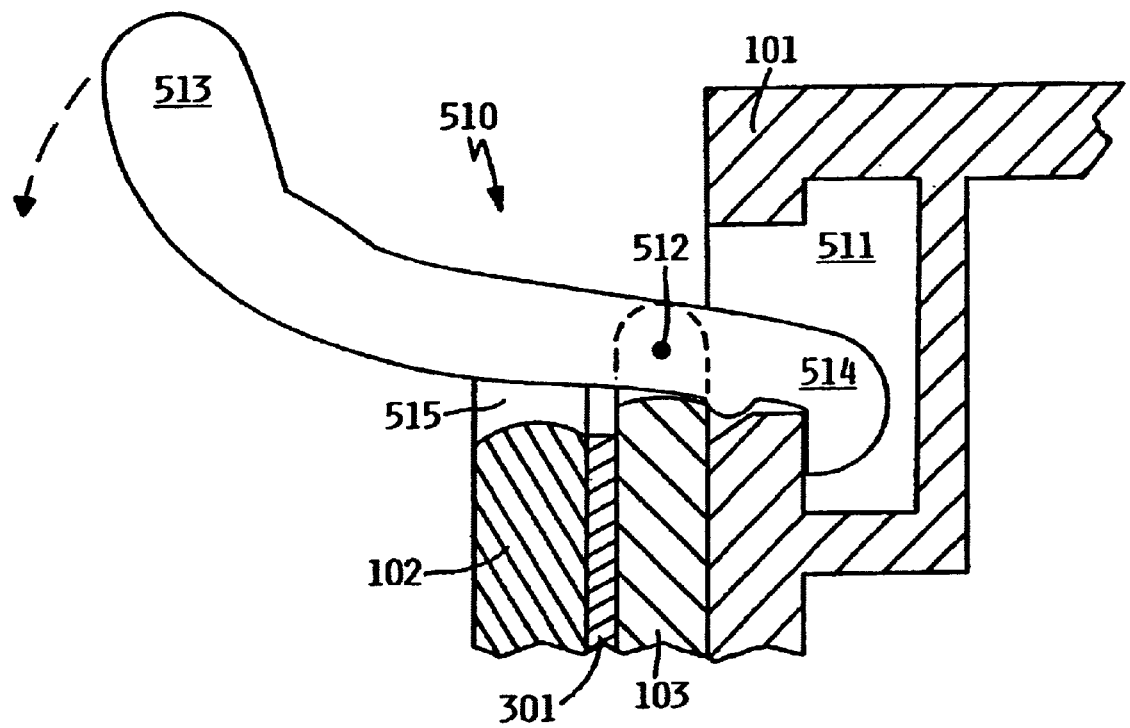
FIG. 5B is a sectional view of the right lever portion of the latch mechanism, which latches the intermediate cover to the frame, according to the preferred embodiment.
Figure 5C:
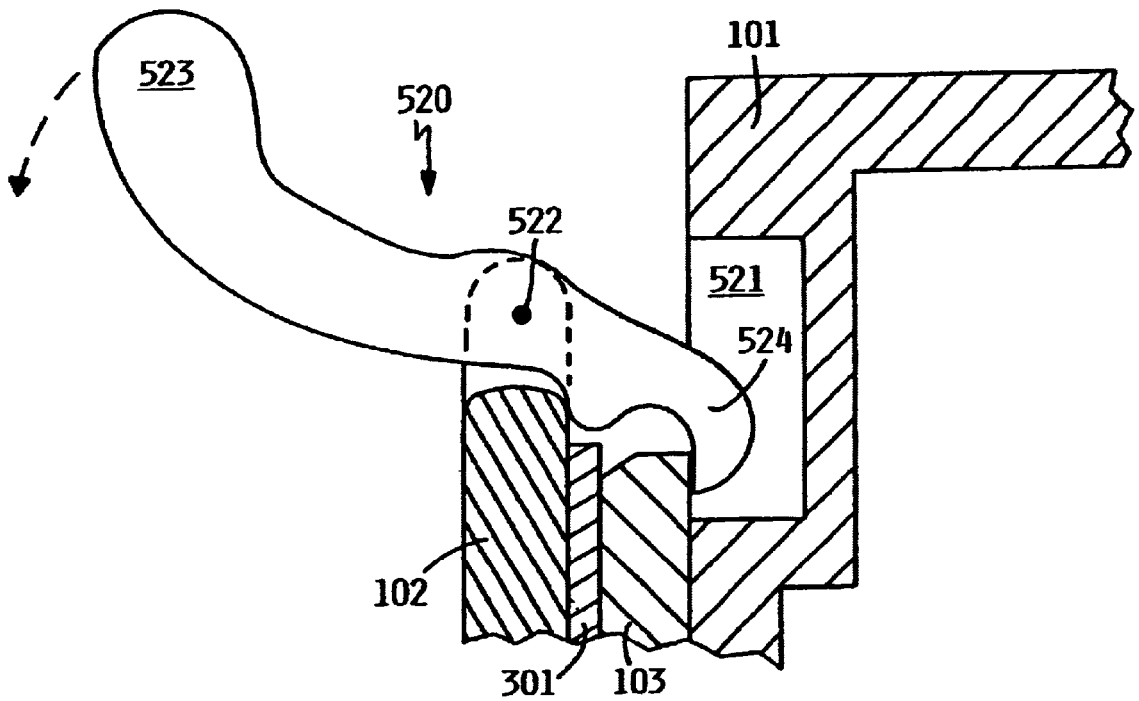
FIG. 5C is a sectional view of the left lever portion of the latch mechanism, which latches the outer cover to the intermediate cover, according to the preferred embodiment.

FIGS. 5A, 5B and 5C show the latch mechanism 107 is greater detail. In each of FIG. 5A, FIGS. 5B and 5C, covers 102 and 103 are in the closed (vertical) position. FIG. 5A is a perspective view of the latch mechanism from the front of scanner 100. Latch mechanism 107 comprises a right lever portion 510 and a left lever portion 520.

FIG. 5B is a sectional view of the right lever portion 510 of latch mechanism 107. Right lever portion 510 latches intermediate cover 103 to frame 101. Lever portion 510 is a pivoting arm mounted on intermediate cover 103, and pivoting about axis 512 which is parallel to the axis of hinge 105. One end of lever 510 provides a handle 513 for grasping and rotating downward as indicated. At the other end is a pawl 514 for engaging a projection in frame 101. A recess 511 in frame 101 provides a limited range of motion for pawl end 514. A biasing spring (not shown) holds lever 510 as shown, with pawl 514 against the projection in frame 101, thus locking intermediate cover 103 to frame 101. When handle 513 is pulled down against the force of the biasing spring, cover 103 is released. Cover 103 is latched to frame 101 by pushing cover 103 against frame, whereby a beveled portion of the frame causes pawl to rotate upwards until it engages the projection in the frame. It will be observed that outer cover 102 contains a relief 515 allowing lever 510 to be released or engaged when outer cover 102 is positioned adjacent intermediate cover 103.

FIG. 5C is a sectional view of the left lever portion 520 of latch mechanism 107. Left lever portion 520 latches outer cover 102 to intermediate cover 103. Lever portion 520 is a pivoting arm mounted on outer cover 102, and pivoting about axis 522 which is parallel to the axis of hinge 105. One end of lever 520 provides a handle 523 for grasping and rotating downward as indicated. At the other end is a pawl 524 for engaging the end of cover 103. A recess 521 in frame 101 provides a limited range of motion for pawl end 524. A biasing spring (not shown) holds lever 520 as shown, with pawl 524 against intermediate cover 103, thus outer cover 102 to locking intermediate cover 103. When handle 523 is pulled down against the force of the biasing spring, outer cover 102 is released from intermediate cover 103, but intermediate cover 103 is not released from frame 101 (unless right lever 510 is simultaneously activated). Outer cover 102 is latched to intermediate cover 103 by pushing the two covers together, whereby a beveled portion of cover 103 causes pawl 524 to rotate upwards until it engages the cover.

Preferably, the latching mechanism should satisfy the following three criteria for optimal performance: (1) the latch should be able to hold intermediate cover 103 in the vertical position while outer cover 102 is pulled down to horizontal; (2) the latch should be able to lock intermediate cover to outer cover while the two covers are rotated in unison; and (3) the latch should be able to hold both covers in the vertical position for scanning and while the scanner is idle. The latch 107 above described satisfies all three criteria, although it will be appreciated by those skilled in the art that many variations in latching mechanism are possible. In addition to spring-biased levers, latches could be any of various mechanical designs or could be magnetic, electro-mechanical solenoids, etc. As used herein, a "latch" or a "latching mechanism" is intended to encompass any of these alternatives.

A user operates scanner 100 as follows. When scanner 100 is idle, both covers 102 and 103 are in the vertical position, and both levers 510 and 520 of latch 107 are engaged, locking covers 102 and 103. The user pulls down handle 523 of left lever 520, thereby releasing outer cover 102 but not releasing intermediate cover 103. The user rotates outer cover 102 to a horizontal position. The user then positions a document (or multiple small documents) for scanning face-up on resilient layer 301. When the user is satisfied with the alignment of the document(s) to be scanned, the user pulls down handle 513 of right lever 510, thereby releasing intermediate cover 103. The user rotates intermediate cover 103 to a horizontal position, pushing it against outer cover 102, thus causing lever 520 to engage, locking intermediate cover 103 to outer cover 102. The document(s) to be scanned is now held in place, sandwiched between outer cover 102 and intermediate cover 103. The high coefficient of friction of layer 301 additionally helps to retain the document(s) in place. The user then rotates outer cover 102 and intermediate cover 103 in unison from a horizontal to a vertical position, pushing the two covers against frame 101, thereby causing right lever 510 to engage, latching the covers to the frame. The user then activates the scanner in a conventional manner, i.e., from a computer, control panel, or the like, to scan the document. The scanned document is removed by reversing the above steps.

Figure 6:
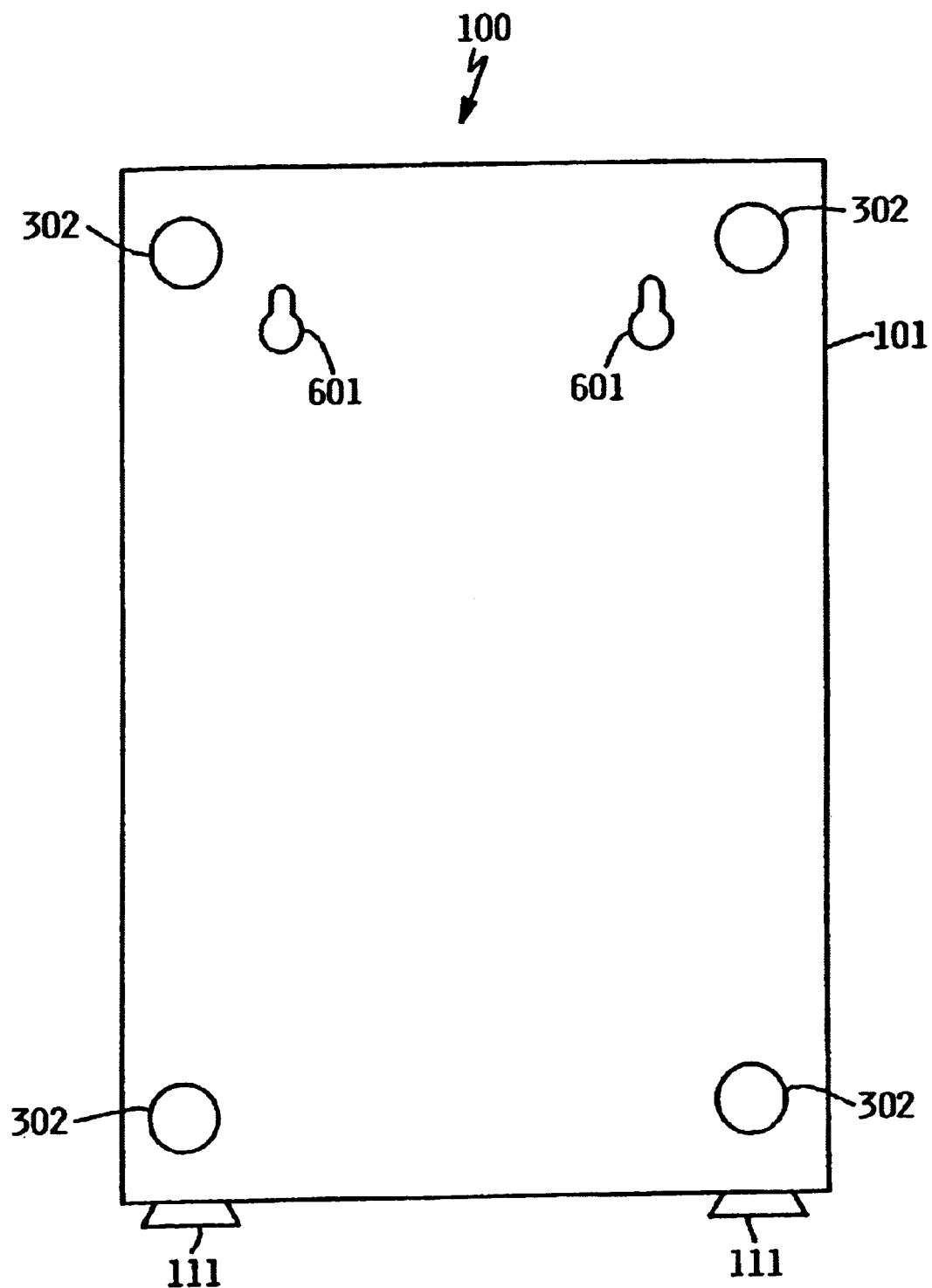
FIG. 6 is a rear plan view of a scanning device, showing wall mounting apparatus, according to the preferred embodiment.

Preferably, scanner 100 can optionally be mounted on a wall or similar vertical surface, in order to further conserve desktop area. FIG. 6 is a rear plan view of scanner 100, showing wall mounting apparatus. Two cavities 601 are molded in the rear surface of frame 101, near the top thereof, as shown. These cavities accept conventional wall-mounting hardware, such as hooks, screw heads, etc. A retailer of scanner 100 may optionally include appropriate wall mounting hardware with the scanner. When wall mounted, feet 106 will dangle, providing no support. For this reason, limit arms 205 are used to hold outer cover 102 in a horizontal position for wall mounting. However, it will be appreciated that there are various alternatives to limit arms 205, e.g. one or more cables of appropriate length extending from the top of frame 101 to the outer edge of cover 102, thus limiting travel of cover 102, nor is it necessary that wall mounting be supported. If wall mounting is not supported, limit aims 205 may be omitted, since swing-down feet 106 provide support to the outer cover when the scanner is resting on a horizontal surface.

Generally, the internal components of scanner 100 are of conventional design, and therefore the width of scanner 100 in the z-dimension, as well as the total volume, are approximately the same as conventional flatbed scanners. The advantage of scanner 100 lies in the fact that the "footprint", i.e., the area of desktop, table or similar surface consumed, is reduced because the z-dimension (perpendicular to the plane of the scanning surface) is typically the shortest dimension of a scanner. The x-dimension and y-dimension are necessarily at least as large as the dimensions of the document to be scanned.

Figure 7:
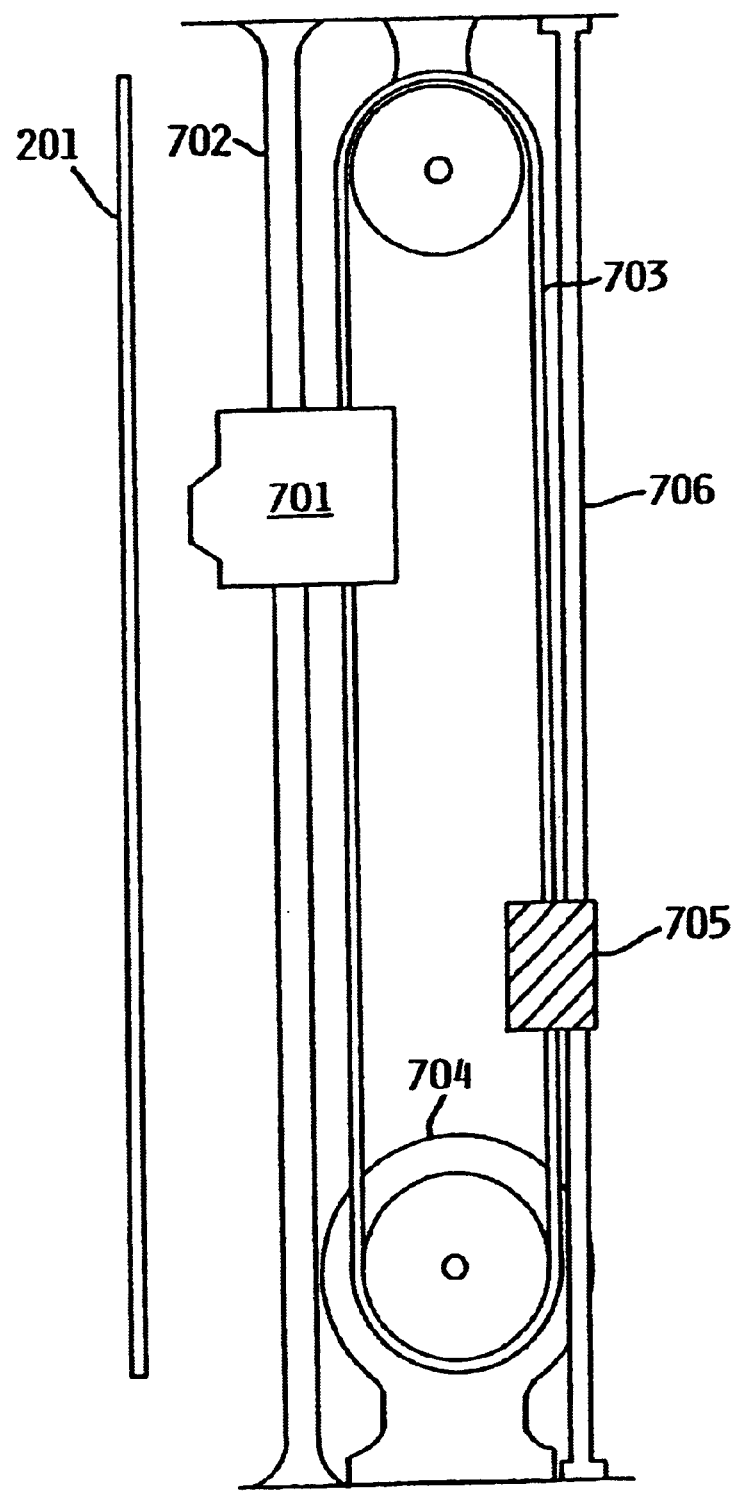
FIG. 7 depicts a simplified internal carriage mechanism which is counterbalanced for vertical motion, according to an embodiment of the present invention.

Because a conventional scanner typically has moving parts which scan the document horizontally, some minor modifications may be necessary for vertical scanning. In particular, depending on the internal component design, it may be necessary to counterbalance a moving carriage or the like for vertical motion. FIG. 7 depicts a simplified internal carriage mechanism which is counterbalanced for vertical motion. Carriage 701 supporting scanning electronics moves along a vertical rail 702. A drive belt 703 attached to an electric motor 704 provides motive force to carriage 701. When rail 702 is positioned horizontally, drive motor 704 has only to overcome the inertial and frictional forces of the carriage and rail. However, when positioned vertically, drive motor must additionally overcome the weight exerted by gravity when moving carriage 701 upwards. If this is a problem, it would be possible to attach counterweight 705 to belt 703 as shown, counterweight 705 weighing approximately the same as carriage 701. Counterweight 705 slides along rail 706, the rail providing lateral support to the counterweight, particularly when the scanner is mounted with the scanning surface in a horizontal orientation. However, there are numerous alternative solutions to this problem. For example, a more powerful motor 704 can be used. Alternatively, the document can always be scanned with carriage 701 moving downward, so that the motor does not need to overcome gravity when scanning; when returning the carriage to its original position, the motor can go much more slowly, so that a more powerful motor or other solution is not required.

In the preferred embodiment, the longest dimension (y-dimension) is oriented vertically, for minimum footprint. However, it would alternatively be possible to design scanner 100 so that scanning surface 201 is oriented with the longer dimension horizontal, and the shorter dimension vertical. Preferably, other design features would retain their orientation, i.e., the axis of hinge 105 would still be horizontal, but hinge 105 would now have a longer length; latch 107 would still be opposite hinge 105, but would be along a longer edge of covers 102 and 103. This alternative design would offer somewhat greater stability since it would have a larger base and not be so tall, at the cost of a larger footprint.

In the preferred embodiment, intermediate cover 103 is used to hold documents in position while cover 102 is rotated from a horizontal position to the vertical scanning position. It would be possible to use alternative means for holding documents in position. I.e., an adhering surface coating, such as from certain adhesives or naturally tacky materials, might be placed on the cover; a static electrical charge might be used; or any of various mechanical clips might be used.

In the preferred embodiment, travel limit arms 205 limit rotation of covers 102, 103 to approximately 90 degrees. However, it would alternatively be possible to remove travel limit arms (particularly if wall mounting is not supported), supporting rotation of covers 102, 103 up to approximately 180 degrees. The advantage of such an approach would be that documents could be arranged face-up on cover 102 when scanner 100 is mounted with the scanning surface 201 in a horizontal orientation (i.e., mounted in the conventional orientation).

While the preferred embodiment of the present invention has been described as a document scanning device, it will be further understood that such a scanning device could be integrated with other functions in a single unit. For example, it could be part of a copier machine, a facsimile transmission device, or any of various multiple function devices.

Although a specific embodiment of the invention has been disclosed along with certain alternatives, it will be recognized by those skilled in the art that additional variations in form and detail may be made within the scope of the following claims:

What is claimed is:

1. A digital image scanning device, comprising:

a frame having respective dimensions in an x-axis, a y-axis and a z-axis, said x-axis, y-axis and z-axis being perpendicular to one another, said dimension in said z-axis being less than said dimension in said x-axis and being less than said dimension in said y-axis;

a flat scanning surface on a first side of said frame for scanning an image, said image being scanned in a fixed orientation relative to said scanning surface, said scanning surface being perpendicular to said z-axis;

positioning apparatus for positioning said frame so that said scanning surface is substantially vertical;

an outer scanning surface cover attached to said device by a first hinge, said first hinge having an axis of rotation parallel to said x-axis, said outer cover rotating on said first hinge between a first position adjacent said flat scanning surface and a second position, said second position for placing thereon a document containing an image to be scanned; and an intermediate transparent cover attached to said device by a second hinge, said second hinge having an axis of rotation parallel to said x-axis, said intermediate transparent cover being rotatable between said scanning surface and said outer scanning surface cover.

2. The digital image scanning device of claim 1, wherein said positioning apparatus comprises a plurality of feet mounted on a second side of said frame, said second side being substantially perpendicular to said scanning surface, said feet for resting on a horizontal surface.

3. The digital image scanning device of claim 1, wherein said positioning apparatus comprises at least one cavity in a second side of said frame for mounting said frame against a vertical surface, said second side being opposite said scanning surface.

4. The digital image scanning device of claim 1, further comprising positioning apparatus for positioning said frame so that said scanning surface is substantially horizontal.

5. The digital image scanning device of claim 1, wherein said first hinge and said second hinge are coaxial.

6. A digital image scanning device, comprising:

a frame;

a flat scanning surface on one side of said frame for scanning an image, said image being scanned in a fixed orientation relative to said scanning surface;

an outer scanning surface cover hingeably attached to said frame, said outer cover rotating on a hinge between a first position adjacent said scanning surface and a second position, said second position for placing thereon a document containing an image to be scanned;

an intermediate transparent cover hingeably attached to said frame, said intermediate transparent cover being rotatable between said scanning surface and said outer cover;

wherein said intermediate transparent layer is positioned adjacent said outer scanning surface cover in said second position after placing thereon a document containing an image to be scanned, thereby holding said document in place; and wherein said outer cover and said intermediate transparent layer holding said document are rotated in unison from said second position to said first position to scan said image.

7. The digital image scanning device of claim 6, further comprising a latching mechanism for latching said outer cover to said intermediate transparent layer while said outer cover and said intermediate transparent layer are rotated in unison from said second position to said first position.

8. The digital image scanning device of claim 6, further comprising a latching mechanism for latching said intermediate transparent layer to a position adjacent said scanning surface while said outer cover is in said second position and said document is being placed thereon.

9. The digital image scanning device of claim 6, further comprising at least one swing-down foot hingeably attached to said outer scanning surface cover, said swing-down foot being in an extended position to support said outer scanning surface cover when said outer scanning surface cover is in said second position, and said swing-down foot being in a retracted position when said outer scanning surface cover is in said first position.

10. The digital image scanning device of claim 6, wherein said frame includes first positioning apparatus for positioning said frame so that said scanning surface is substantially vertical, and second positioning apparatus for positioning said frame so that said scanning surface is substantially horizontal.

11. The digital image scanning device of claim 6, wherein said frame comprises at least one cavity in a second side of said frame for mounting said frame against a vertical surface, said second side being opposite said scanning surface.

12. The digital image scanning device of claim 6, wherein said outer scanning surface cover and said intermediate transparent cover are hingeably attached to coaxial hinges.

13. A digital image scanning device, comprising:
a frame;
a flat scanning surface on one side of said frame for scanning an image, said image being scanned in a fixed orientation relative to said scanning surface;
an outer scanning surface cover hingeably attached to said frame, said outer cover rotating on a hinge between a first position adjacent said scanning surface and a second position, said second position for placing thereon a document containing an image to be scanned;
a hingeably attached intermediate transparent cover positioned between said outer scanning surface cover and said flat scanning surface;
wherein said digital scanning device is operated by rotating said outer scanning surface cover away from said flat scanning surface to said second position, placing a document to be scanned face-up on a side of said outer scanning surface cover facing said flat scanning surface while said outer scanning surface cover is in said second position, closing said hingeably attached intermediate transparent cover against said document to retain said document in place rotating said outer scanning surface cover with said document in place in unison with said intermediate transparent cover to said first position adjacent said scanning surface, and scanning said document while said outer surface cover is in said first position.

14. The digital image scanning device of claim 13, wherein said frame includes first positioning apparatus for positioning said frame so that said scanning surface is substantially vertical, and second positioning apparatus for positioning said frame so that said scanning surface is substantially horizontal.

15. The digital image scanning device of claim 13, wherein said frame comprises at least one cavity in a second side of said frame for mounting said frame against a vertical surface, said second side being opposite said scanning surface.

16. The digital image scanning device of claim 13, wherein said outer scanning surface cover and said intermediate transparent cover are hingeably attached to coaxial hinges.

* * * * *